Oct. 13, 1936.  C. W. GREEN  2,057,519
CASH REGISTER
Filed June 8, 1925  7 Sheets-Sheet 1

Inventor
Charles W. Green
By
Attorneys

Oct. 13, 1936.   C. W. GREEN   2,057,519
CASH REGISTER
Filed June 8, 1925   7 Sheets-Sheet 2

Inventor
Charles W. Green
By A. A. hlickl
H. C. Diserud
Attorneys

Oct. 13, 1936.  C. W. GREEN  2,057,519
CASH REGISTER
Filed June 8, 1925   7 Sheets-Sheet 3
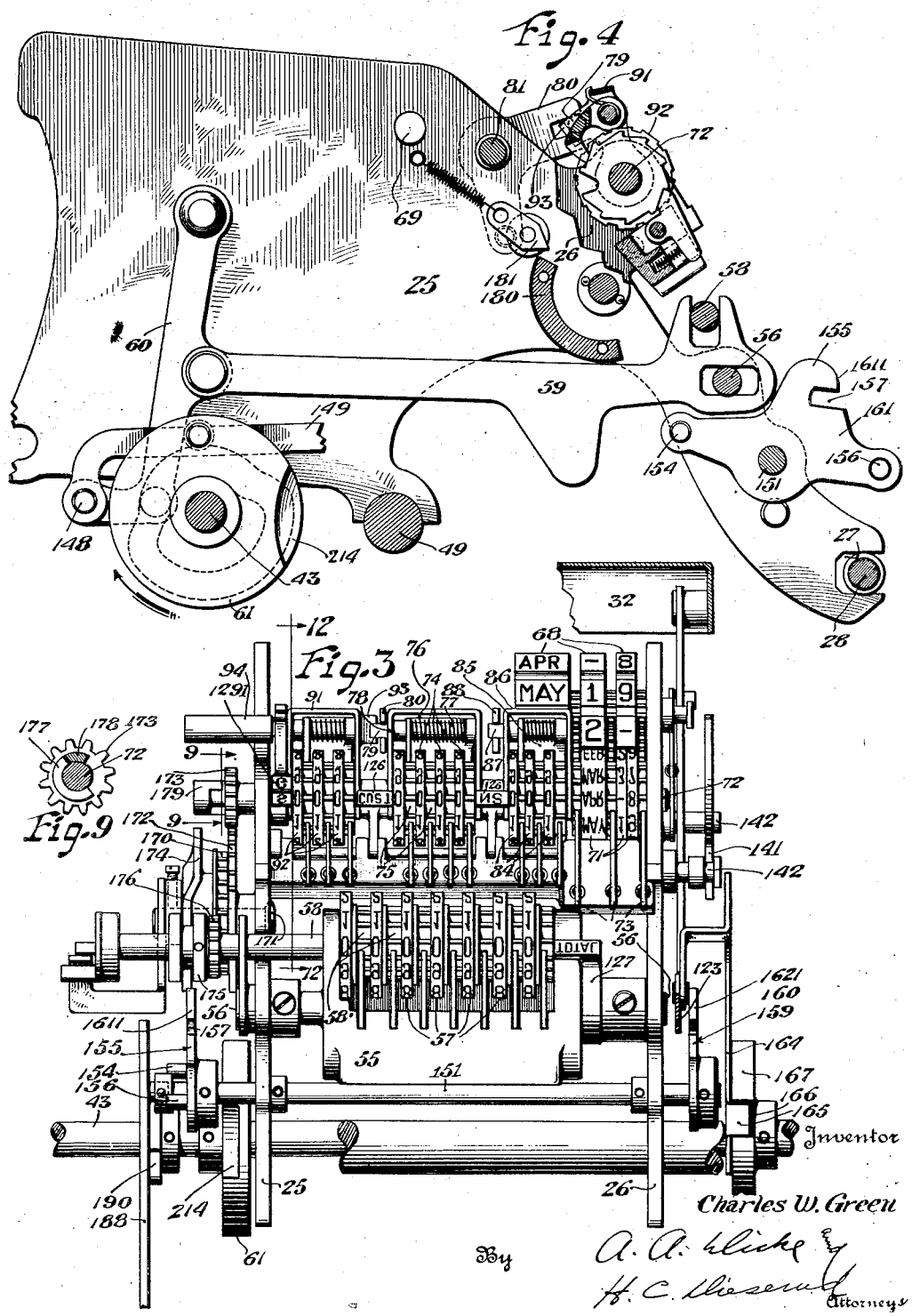

Oct. 13, 1936.　　　C. W. GREEN　　　2,057,519
CASH REGISTER
Filed June 8, 1925　　　7 Sheets-Sheet 5

Inventor
Charles W. Green
By
Attorneys

Oct. 13, 1936.  C. W. GREEN  2,057,519
CASH REGISTER
Filed June 8, 1925    7 Sheets-Sheet 6

Inventor
Charles W. Green

Oct. 13, 1936.  C. W. GREEN  2,057,519
CASH REGISTER
Filed June 8, 1925   7 Sheets-Sheet 7
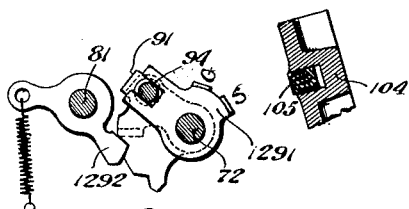
Fig. 12
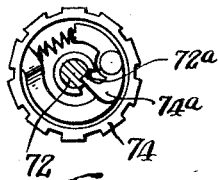
Fig. 7A
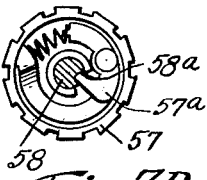
Fig. 7B
0 0 0 8 4.96 TOTAL
S 002 CUST 0 50 NS 003 MAY 11
Fig. 13
0 0 3 2 5.18 TOTAL
G 002 CUST 450 NS 028 MAY 18
Fig. 14
0 0 0 0 0.00 TOTAL
G 002 CUST 000 NS 000 MAY 18
Fig. 15
Inventor
Charles W. Green
By A. A. Wicks and
H. C. Liesenud
Attorneys Patented Oct. 13, 1936

2,057,519

UNITED STATES PATENT OFFICE 2,057,519

CASH REGISTER

Charles W. Green, Ilion, N. Y., assignor, by mesne assignments, to The National Cash Register Company, Dayton, Ohio, a corporation of Maryland Application June 8, 1925, Serial No. 35,600

22 Claims. (Cl. 235—2)

This invention relates generally to cash registers of the key operated type and particularly to that class adapted to totalize a series of items and employing printing devices for obtaining the printed totals and other information.

In cash registers of the type particularly suited for obtaining printed totals it is desirable that some of the totals which are obtained be followed by a clearing operation while other totals obtained should be independent of a clearing operation. In those operations where no clearing is performed after the printing of totals the printed record material will show "running" or intermediate totals and it will indicate the amount of business transacted subsequent to the last clearing operation and up to the time that the total is printed. At the termination of some arbitrary period a total which, in the art, is designated as a "grand" or final total is obtained and it is followed by a clearing or resetting operation so that the totalizer elements may be ready for the accumulation of items pertaining to a subsequent period of business.

In order that the machine should be capable of properly designating the character of the total which has been printed it is broadly an object of the present invention to include means whereby each printed total will be accompanied by a special printed character or distinguishing mark. For the purpose of providing a suitable check upon the resetting operations to which the totalizer has been subjected the present invention contemplates the inclusion of means for indicating upon the record material the number of times that the totalizer and certain special counters have been restored to zero. By properly preserving the printed records which contain the special designation indicating the taking of a grand total and by insuring that these records contain consecutively the numbers indicating the number of resetting operations performed a complete check is provided over the totals of amounts entered into the machine.

Registers of the type herein disclosed which are adapted to print totals are especially suited to a system of chain stores in which the manager of each individual store daily submits to the head office a printed record of the days business which may be ascertained by a comparison of the running total for a particular day with the running total of the preceding day. Periodically an auditor may visit each store and obtain a total of the business accumulated during the arbitrary period and subsequently he may restore the totalizer elements to their zero positions so that they may separately accumulate the items comprising a subsequent period. Without the employment of suitable distinguishable characters for identifying the printed totals and other safeguards which will be mentioned it will be obvious that a dishonest auditor might fraudulently obtain a printed record exhibiting a total of the business transacted merely up to some time prior to the actual termination of the regular period while the resetting could then be performed at the end of such regular period. Since he ordinarily collects the cash receipts he would then be responsible to the Head Office for only the amount represented by the last printed total, which would permit him to retain the amount of cash received during the time the total was printed and the time the accumulators were restored to zero.

Such fraudulent operation would, of course, be quite difficult if the managers of the various stores were careful to observe and report the improper operations of the auditor, but as is all too frequently the case the managers and the auditor may be in collusion. The ability to defraud the company would moreover be facilitated where one person alone is made responsible for all the totals submitted to the head office since, in such case in the absence of careful checking and inspection, he could submit such printed records as he desired, and the attempt to defraud could only be discovered by an inventory of the stock which in itself is a laborious task.

Mechanism has been provided to prevent the operation of the resetting means until after a manipulative control means has been operated to condition the machine for a grand total printing operation, and to prevent the entry of further items until a resetting or clearing operation has been carried out.

The printing mechanism, in the illustrative embodiment of the present invention, which is adapted to print the various totals and other information upon a record strip is normally safeguarded against improper and fraudulent operation by unauthorized persons by a hinged cover which is releasable by the operation of a lock. The printing button which, when operated, serves to print the desired data upon the record material is located under this cover and is normally operable so that when the cover is raised a total may be printed at any time. In order that the totals which are not followed by a subsequent clearing operation may be suitably identified, a special character printing element is provided so that when in its normal position it will indicate this fact upon the record material, while if the printing operation is to be followed by a clearing operation the same printing element will be shifted to cause the printing of a different special character. In order to properly identify such a total which is to be followed by a clearing operation it is necessary to depress a special key before the printing operation is effected. Depression of this key serves to adjust the special type printing element so that when the printing button is subsequently operated the proper identifying character will be printed upon the record strip. Depression of the special key serves in addition to unlock the resetting lever which is normally locked but the operator will of course, obtain the printed total before this lever is manipulated to zeroize the totalizer elements. Besides the shifting of the special type element and the unlocking of the resetting lever by the depression of the special key a number of other functions are performed, such as, locking the keys against a subsequent operation until the resetting lever has been manipulated, and releasing the locked cash drawer so that its contents may be removed. After the final total has been printed the manipulation of the resetting lever not only zeroizes the totalizer elements, but in addition unlocks the operating keys and restores the special key to its normal position.

The special key also has suitable connections to a counter whereby the latter will count only effective resetting operations, this being assured by the fact that depression of the key will merely condition the counter for operation while it is not until a subsequent operation of the machine that a unit will be added to this counter.

The present invention embraces a number of interlocking devices between the different manipulative members so that mis-operations, either intentional or accidental, may be minimized or entirely eliminated. The interlocks which are provided are very simple, but effective in operation thus precluding any possibility of their becoming out of order.

As previously stated manipulation of the resetting lever according to the present invention will permit a subsequent operation of the operating keys which in addition to causing certain mechanism to insert a unit in a reset counter, will also restore the special printing element to its normal position so that it will thereafter continue to print the identifying character designating intermediate totals.

Many other objects and advantages of the present invention will appear from the detailed description of a preferred embodiment which will hereinafter be given and it will be noted that by the employment of devices for printing special characters an opportunity to defraud will be greatly minimized thereby enhancing the value of the registers to which the present invention is applied.

With these and incidental objects in view the invention consists of certain novel features of construction and combination of parts the essential elements of which are set forth in the appended claims and a preferred form or embodiment of which will now be described with reference to the drawings which accompany and form part of the specification.

Of said drawings:

Fig. 1 is a sectional view of the machine taken substantially through its mid-portion. This view shows particularly the differential and totalizing devices and their relation to each other as well as a section through the printing mechanism provided for effecting total printing from the totalizer and other type wheels.

Fig. 2 is a top plan view of the machine, the cabinet having been removed. This view shows the arrangement of the operating keys, the totalizer, the special counters and date setting wheels. This view also shows the lock which is provided to unlock the hinged cover to obtain access to the different manipulative devices.

Fig. 3 is a view taken in a plane which is substantially parallel to a plane passing through the shafts which support the printing type wheels and shows the totalizer, the date setting wheels, and special counters. This figure also illustrates the resetting means common to the totalizer and special counters.

Fig. 4 is a sectional view showing the totalizer engaging devices as well as a section through the reset counter illustrating the details of construction of the latter.

Figure 5:
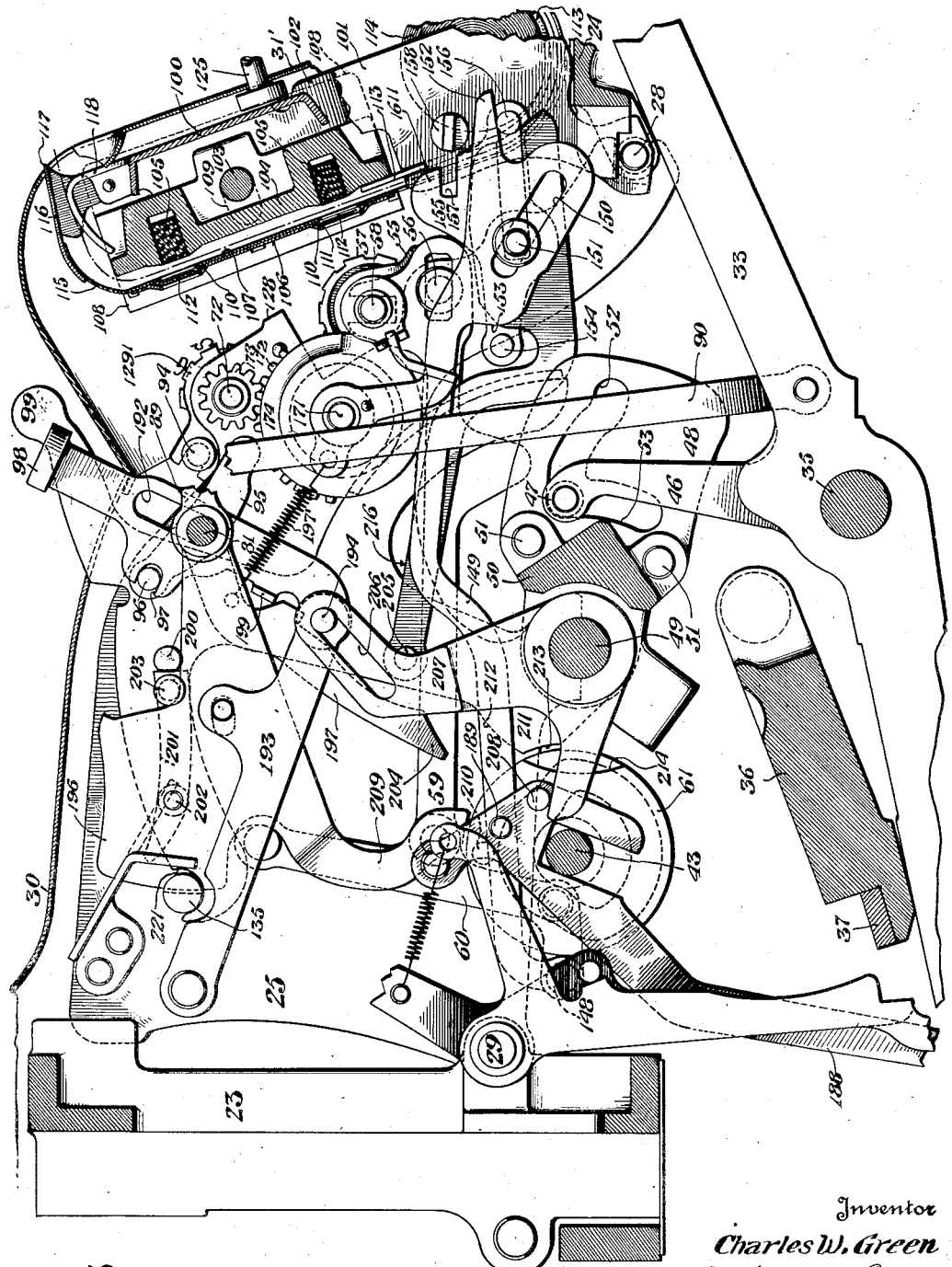

Fig. 5 is a sectional view of the machine showing the details of the printing mechanism, the totalizer engaging devices and the lever for resetting the various registering elements to their zero positions. This view shows also the means for normally locking the resetting lever against operation, as well as the devices controlled by the special key for unlocking it and accomplishing various other functions.

Figure 6:
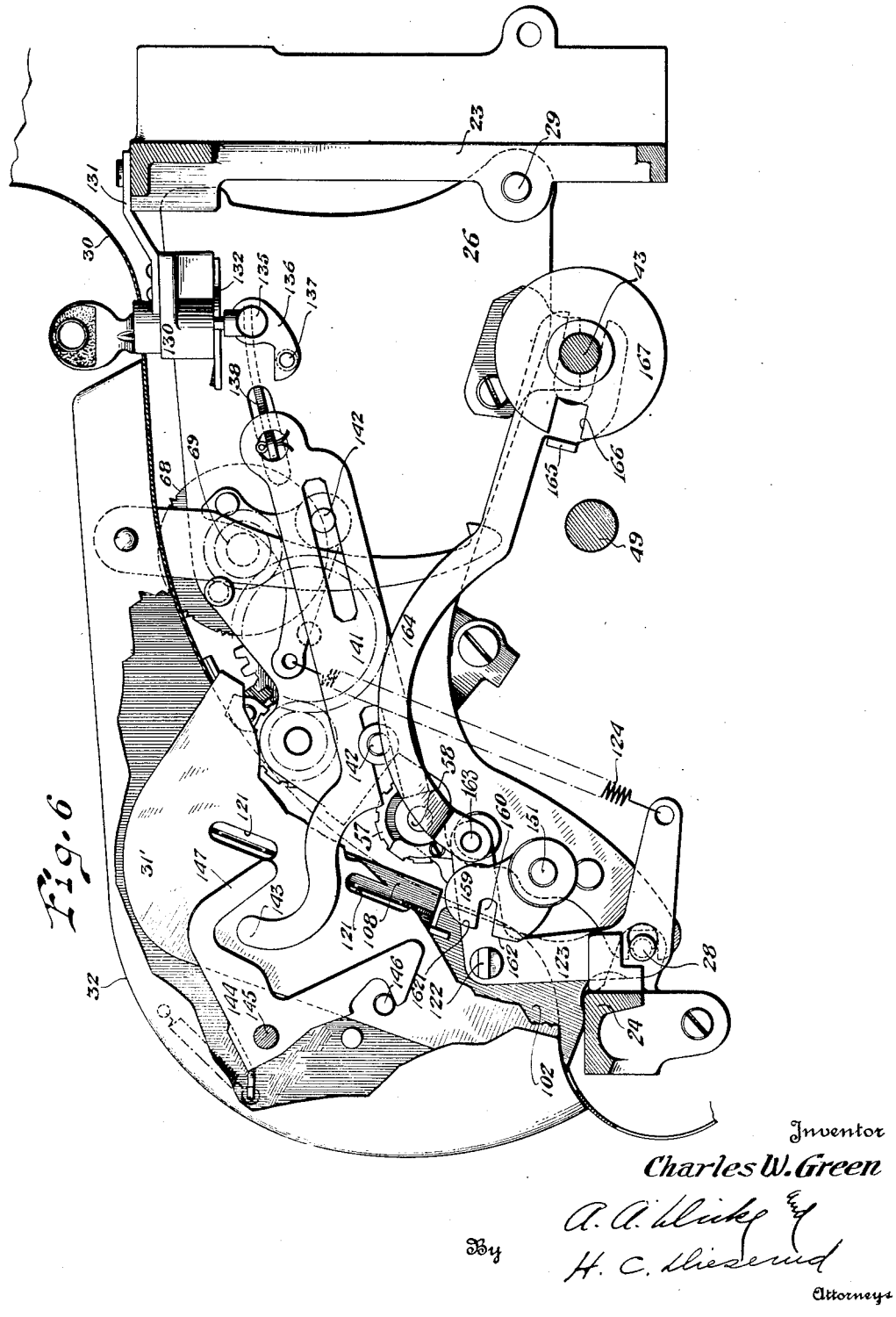

Fig. 6 is a view toward the left taken on a section just to the right of one of a pair of the intermediate supporting frames, showing the lid releasing devices and the interlocking devices between the printing mechanism and driving shaft.

Figure 7:
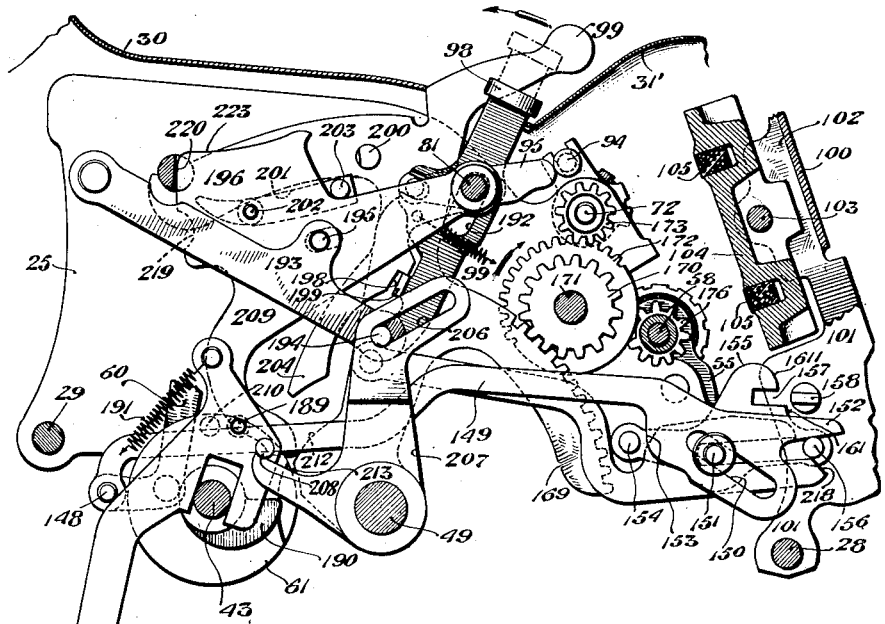

Fig. 7 is a view similar to Fig. 5 but omitting a number of the parts and showing the special "Total and Reset" key in its depressed position.

Fig. 7a is a view showing the pawl and notch arrangement used in resetting the "Customer" and "No Sale" counters.

Fig. 7b is a view of a totalizer wheel and the pawl and notch construction for resetting it.

Figure 8:
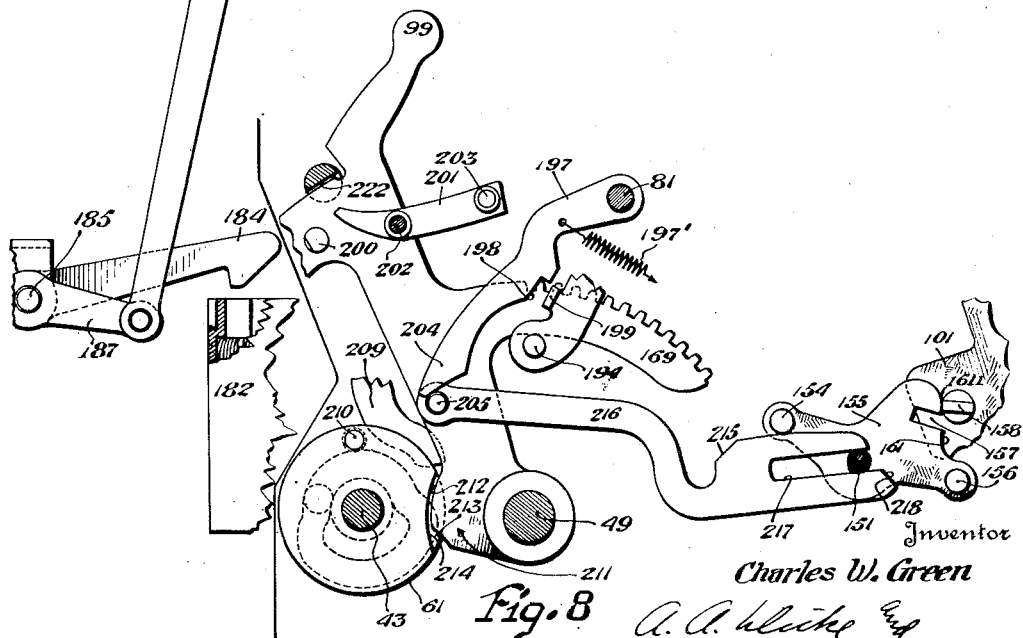

Fig. 8 is a fragmentary sectional view showing the position that the various parts assume when the resetting lever is drawn from its normal position to its extreme rearward position.

Fig. 9 is a detail sectional view of the counter resetting shaft taken on the lines 9—9 of Fig. 3.

Fig. 10 is a detail of the operating devices for the "Customer" counter.

Fig. 11 is a top plan view of a portion of the cabinet cover showing the special "Total and Reset" key.

Fig. 12 is a fragmentary sectional view taken on line 12—12 of Fig. 3 showing the special printing member for normally printing the letter "S" and the means for adjusting it to print the letter "G" when it is desired to print a total preceding a clearing operation.

Figs. 13 and 14 are examples of total printing which may be produced by the illustrative machine. The manner in which the special printing member prints the different characters is clearly shown in these figures.

Fig. 15 is an example of printing performed by the machine after the resetting operation has been performed.

For the convenience of description the principal elements of the machine will first be enumerated and their general purposes, arrangement and co-operation will be briefly explained in order to indicate the general operation of the machine as a whole after which the preferred construction of these parts will be described more in detail, together with the function, construction and operation of certain secondary or accessory mechanisms associated therewith.

Briefly stated in general terms the present machine to which the invention is shown applied, is of the key operated type of cash register having a plurality of banks of amount keys and a special operating key designated as the "No Sale" key. All of the amount keys operate a differential mechanism for the purpose of inserting the items in a totalizer. As is usual in this class of machines when the keys are operated they drive a power shaft from which the various parts of the mechanisms are operated.

During each operation of the machine a unit is entered in a counter designated as the "Customer" counter and each time that the "No Sale" key is operated its associated counter will also be operated.

In order to lock the various manipulative devices other than the operating keys against unauthorized operation a hinged cover is provided, which, when securely locked prevents access to said devices, but by the operation of a lock the hinged cover may be unlocked at any desired time.

In order to print the totals and other information standing upon the totalizer, the special counters and a series of date printing wheels, a suitable printing mechanism is provided which is operated by the depression of a knob extending from the front of the printer cabinet, the knob being normally protected against improper manipulation by means of the hinged cover just referred to. The printing mechanism is normally operative and so long as the hinged cover is lifted it may be operated at any time and as many times as is desired by merely depressing the printer knob. Normally a special character is printed upon the record material, which, in itself has a particular significance indicating that no clearing or resetting operation can be performed after the total printing operation. After printing, the paper is simply drawn out and detached from the rest of the roll, through the aid of a suitable tearing edge.

When it is desired to print the totals pertaining to the termination of some arbitrary period at which time the totalizer is to be cleared, the machine is so constructed that this total will be designated in some special manner upon the record material so that the various printed totals may be easily differentiated. In order to print such a total it is necessary in the illustrative machine to depress a special key designated as "Total Reset" which key adjusts the special type printing member so that the letter "G" will be printed when the printing mechanism is subsequently operated. Depression of this special key will also perform a plurality of other functions, such as, releasing the cash drawer and shifting the "Reset" counter operating means so that when an operating key is subsequently operated a unit will be added to the counter to cause it to denote a "Reset" number corresponding to the next series of items to be registered.

Upon completion of the printing operation which prints the information relating to the termination of a given period, the resetting lever which has been unlocked by the depression of the special key, is manipulated so that all the elements of the totalizer and counters will be restored to zero, with the exception of those belonging to the "Reset" counter.

In order to insure that the manipulated devices are properly operated special interlocking devices are provided so that two of them cannot be operated simultaneously. This insures the proper recording of the amounts and the proper performance of the printing and resetting operations.

The general organization and operation of the machine as a whole having been thus outlined, the preferred construction of the various parts above referred to will now be described more in detail.

*Framework*

Figure 1:
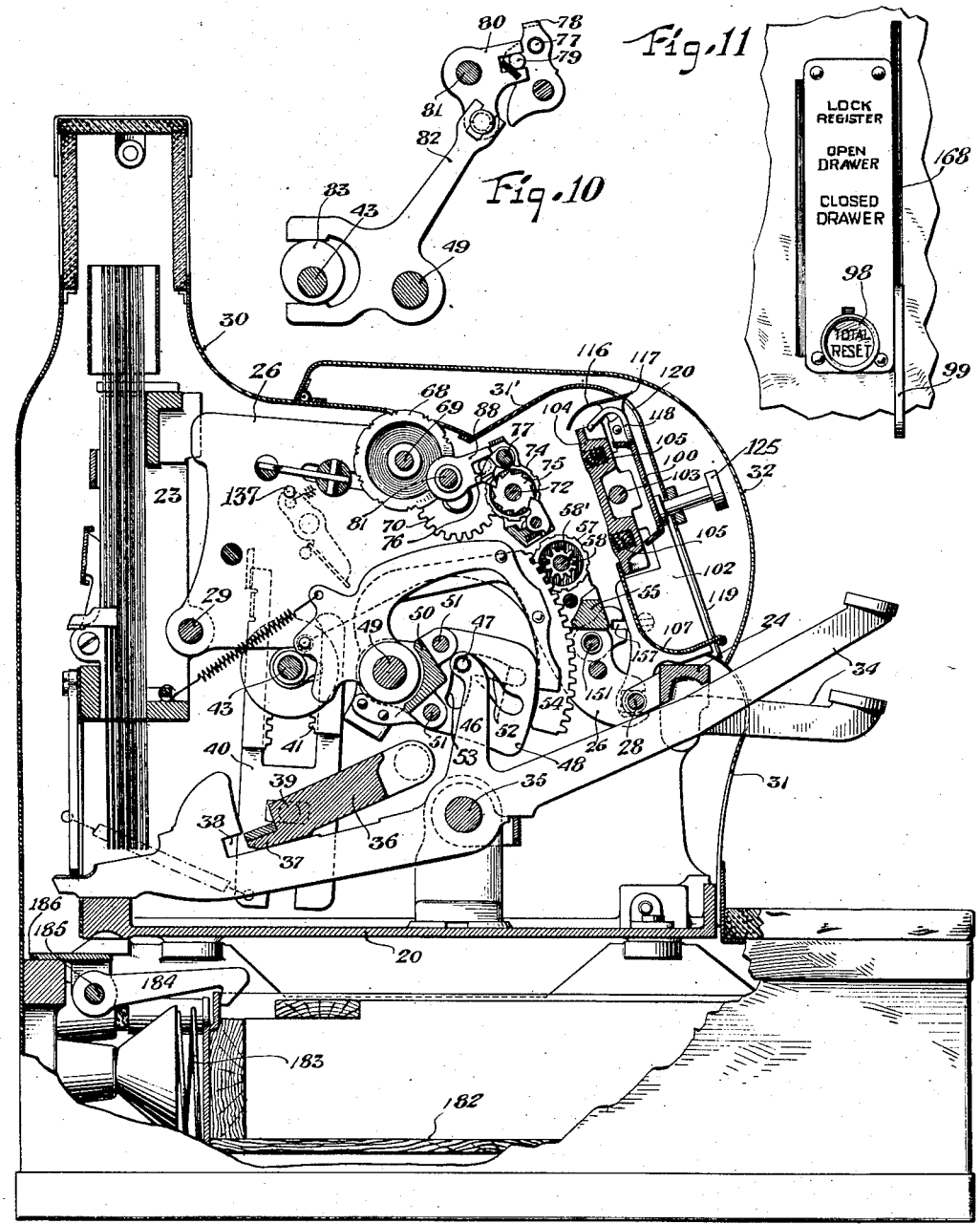
Figure 2:
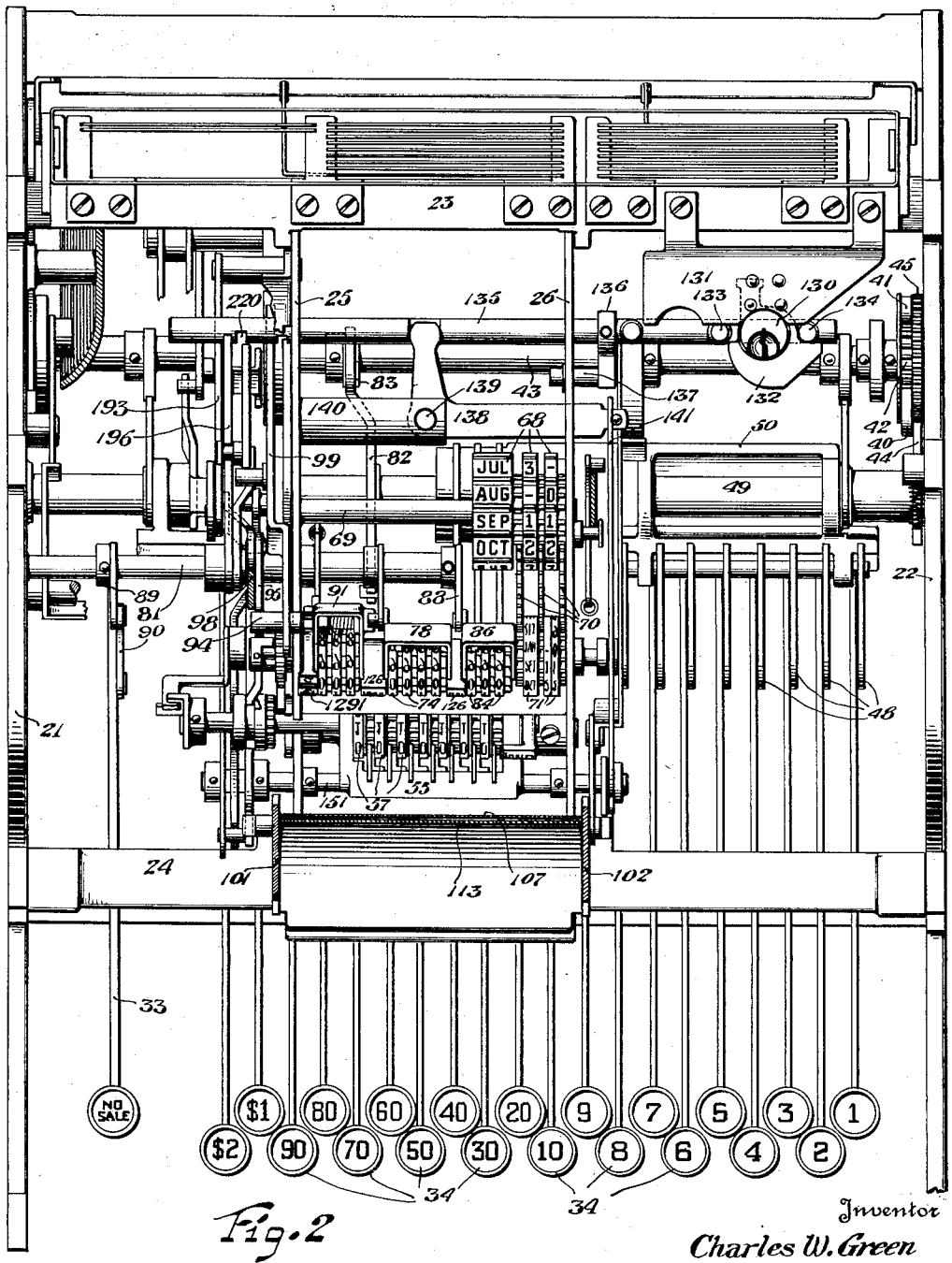

The various parts of the mechanism are supported by a suitable framework comprising a base 20 and parallel side frames 21 and 22 (Figs. 1 and 2). Extending between the rearward end of the frames 21 and 22 is a supporting frame 23 utilized to support the indicating and other mechanisms. The side frames 21 and 22 are rigidly connected together at their forward ends by a bar 24. Extending between the supporting frame 23 and the bar 24 and parallel to the frames 21 and 22 are frames 25 and 26, the front ends of which are bifurcated at 27 (Fig. 4) to engage a shaft 28 passing through ears integral with the bar 24. The upper rear ends of the side frames 25 and 26 rest against the frame 23 while the lower rear ends of the frames 25 and 26 are apertured to receive a shaft 29 which passes through ears integral with the framework 23. The intermediate frames 25 and 26 are furthermore suitably joined together by means of shafts and further connections which will be referred to hereinafter. As best shown in Fig. 1 the mechanism is enclosed by a cabinet 30 which may be made of any desired material. The cabinet 30 is slotted at 31 to receive the forward ends of a series of key levers and is furthermore apertured at its upper end to permit the viewing of the raised indicators. The printing and other associated mechanisms are concealed by means of a cover 31' which is rigidly attached to the cabinet 30, but is apertured so as to permit the access to certain other parts. In order to completely conceal and to prevent unauthorized persons from having access to the printing devices, as well as other manipulative devices, including a "Total and Reset" key and a resetting lever, these are adapted to be covered by means of a cover 32 hinged to the cabinet 30 and so arranged that when the cover is securely locked access cannot be had to any of the devices just mentioned.

*Keys and key coupler*

The illustrated machine is provided with a number of keys 34 divided into groups (Figs. 1 and 2), one group for registering amounts from 1¢ to 9¢, another group for amounts ranging from 10¢ to 90¢ and a third group for registering values of $1.00 and $2.00 amounts. If desired additional keys may, of course, be provided. A special key 33 is also provided and designated as the "No Sale" key, the function of which is to release the cash drawer when it is desired to make change, etc. The amount keys 34 and the "No Sale" key 33 are pivoted upon a shaft 35 (Figs. 1 and 5), journalled between the side frames 21 and 22, and resting upon the rear ends of the keys is a key coupler 36 provided with a nose 37 co-operating with notches 38 formed in the rear ends of the operating keys. When the forward ends of the operating keys are depressed the key coupler is rocked clockwise and the nose 37 enters the notches 38 of the depressed keys. The purpose of such key coupler mechanism is well known in the art and therefore need not be discussed herein in detail.

Connected to the key coupler at 39 is a vertically reciprocating rack plate 40 (Figs. 1 and 2) provided with rack teeth 41 which alternately mesh with a gear 42 (Fig. 2) fast to a shaft 43. The arrangement of this mechanism is such that a reciprocation of the key coupler 36 by the operating keys will effect a complete rotation of the gear 42 and the shaft 43. This mechanism is also well known in the art and shown in many patents, and therefore need not be described in further detail.

After a registration has commenced it is essential that some device be provided to insure a complete performance of the started registration before a second operation can subsequently be effected. To this end any suitable mechanism may be provided, and in the present instance it comprises a spring-pressed pawl 44 bearing against a ratchet wheel 45 secured to the main operating shaft 43.

Differential mechanism

The differential mechanism or devices controlled by the various groups of keys for entering the desired amounts in the totalizer are all similar in construction and principle and a description of one will suffice for all. Each amount key 34 associated with the dimes group of keys (Fig. 1) is provided with an upwardly extending arm 46 carrying a suitable anti-friction roller 47 cooperating with a differential slot 52 formed in a cam plate 48. Loosely mounted upon a transverse shaft 49 which is journalled between the machine side frames is a frame 50 provided with spaced slots in which are secured by means of pins 51, a series of the cam plates 48. Fig. 2 of the drawings shows the relation between the operating keys associated with the pennies bank and the cam plates 48 which are carried by the frame 50.

The cam plates 48 are provided with L shaped slots 52 and 53, the slots 53 being concentric with respect to the shaft 49. The slots 52 are, however, graduated so that when the roller 47 carried by the arm 46 of a depressed key operates in the cam slot 52 of its associated cam plate 48 it will move the frame 50 differentially and to an amount commensurate with the value of the key depressed. When, however, the frame 50 is rocked by the depression of a key 34 of a certain group, the rollers 47 related to the undepressed keys of that group will play in the arcuate slots 53 of their respective cam plates 48, thereby permitting the frame 50 to be rocked differentially without interference from the rollers 47 of the unoperated keys.

It is to be understood that there is a differential frame for each group of amount keys and that the differential frame associated with each of the three groups of amount keys has attached thereto a segmental rack 54 (Fig. 1). From the above, it will be evident that since there may be nine keys in a particular group and a corresponding number of cam plates 48 the segmental rack 54 may be rocked to any one of nine different positions by the depression of a key 34 associated with such group of keys. Depression of keys in two or more groups will similarly adjust their associated segmental racks differentially so that this movement can be transferred to the totalizer pinions in a manner which will now be described.

Totalizer engaging mechanism

The totalizer embodied in the machine shown in the drawings comprises a frame 55 (Figs. 1, 2, 3 and 5) which is journalled in the intermediate frames 25 and 26 by means of journal pins 56 passing through the intermediate frames 25 and 26 and into sockets formed in the totalizer frames. These pins are the pivotal points of the totalizer frame and the frame is adapted to be rocked about these points as a center to bring the totalizer pinions in mesh with the actuating racks 54 at the proper time. The totalizer may be made up of any desired number of numeral elements but as illustrated comprises a series of seven wheels 57 loosely mounted upon a shaft 58 journalled in the totalizer frame 55, and the peripheries of these wheels are formed with raised characters so as to effect printing upon a suitable impression material. Each printing wheel 57 has attached thereto a pinion 58', the three lower order ones of which are adapted to mesh with the teeth of the segmental racks 54 hereinbefore referred to.

In order to mesh the pinions 58' with the segmental racks 54 the following mechanism is provided, reference being had particularly to Figs. 4 and 5. Slidably mounted on the left hand journal pin 56 is a bar 59 which is connected at its rear end to the mid-point of an arm 60 pivoted on a stud extending from the left side of the frame 25. The lower end of the arm 60 carries a stud adapted to engage a slot formed in a box cam 61 fast to the rotation shaft 43 while the forward end of the bar 59 is bifurcated to engage the shaft 58, which it will be remembered, carries the totalizer wheels and pinions.

During the downward stroke of the keys the shaft 43 will be rotated in the direction of the arrow shown in Fig. 4 and due to the configuration of the slot in the box cam 61 the bar 59 will be drawn rearwardly early in the depression of the keys so as to rock the totalizer frame 55 about its pivotal point 56 to bring the totalizer pinions in mesh with the racks 54 which are then differentially operated under control of the keys as before explained. During the return stroke of the keys the box cam will again act upon the bar 59 forcing it forward thereby withdrawing the totalizer pinions from engagement with the actuating racks 54 and leaving the pinions 58' in their differentially adjusted positions.

In machines of the class under consideration, it is also essential that transfer devices be provided for carrying a unit from lower to higher order wheels of the totalizer and any suitable means may be provided for this purpose. Inasmuch as this mechanism forms no part of the present invention it will not be described herein.

Date printing wheels and associated setting devices

It is desirable that when the total amount of the sales and other information is printed upon a record bearing material that some means be provided to designate the date to which the information pertains or in some cases to show the end of some arbitrary period to which it relates.

For this reason the present register includes a series of date setting devices in the form of adjustable wheels 68 (Figs. 1, 2, 3 and 6) which project through an aperture formed in the cabinet 30, but which are normally protected against improper manipulation by means of the hinged cover 32 previously referred to. The date setting wheels 68 which are adjustable to set up the days as well as the names of the months are mounted upon a shaft 69 which is fastened at its extreme ends to the intermediate frames 25 and 26. Each wheel 68 has integral therewith a pinion adapted to mesh with the teeth of a co-operating pinion 70 (Fig. 1) which is loosely mounted upon a stub shaft attached to the side frame 26. The intermediate pinions 70 likewise mesh with the pinions of printing wheels 71 (Figs. 2 and 3) formed with raised characters and which are loosely mounted upon a shaft 72 passing between the intermediate frames 25 and 26. In order to hold the type wheels in their adjusted positions there is provided a series of spring-pressed aligning pawls 73 (Fig. 3) of the usual type and well known in the art. By means of the wheels 68 the date printing wheels 71 may be adjusted to any position so as to print the desired date upon the record bearing material when the printing mechanism is operated.

The special counters are of the multiple pawl, deep notch transfer type, well known in the art and described in many patents, one of which is the patent to Thomas Carney, #876,295, dated January 7, 1908. The consecutive numbering counters are all mounted in one line on the shaft 72, which, it will be recalled, supports the dating type wheels.

The "Customer" counter which is situated between the "No Sale" and "Reset" counter comprises four wheel 74 (Figs. 1, 2 and 3) the peripheries of which are formed with raised printing characters and these wheels have attached thereto ratchet wheels 75 co-operating with a multi-prong actuating pawl 76 (Fig. 1). The actuating pawl 76 is spring-pressed and pivotally mounted by means of a pin 77 in a bail 78 loosely mounted upon the shaft 72. The bail 78 has attached thereto a pin 79 (Figs. 3 and 10) co-operating with a slot formed in the bell-crank 80 loosely mounted upon a shaft 81. The lower end of the bell-crank 80 is connected by means of a pin and slot to a second bell-crank 82 loosely mounted upon the shaft 49 and bifurcated at its extreme rearward end to co-operate with an eccentrically mounted disk 83 fast to the shaft 43

From the above it will be evident that when the shaft 43 is rotated by means of an operation of a key, the bell-crank 82 will be rocked and through the co-operating bell-crank 80 will rock the bail 78 and through the actuating pawl 76 insert a unit in the "Customer" counter.

The "No Sale" counter which is just to the right of the "Customer" counter (Fig. 3) is formed of three wheels 84, the peripheries of which are formed with raised printing characters and these wheels have also attached thereto ratchet wheels co-operating with a multi-prong pawl 85 (Fig. 3) similar to the pawl 76 described in connection with the "Customer" counter. The actuating pawl 85 is carried by the bail 86 to which is attached a pin 87 co-operating with an arm 88 (Figs. 1 and 2) rigidly secured to the shaft 81. As is best shown in Fig. 2 the shaft 81 passes through the frame 25 and is journalled at its left end in the side frame 21 and has attached thereto a second arm 89 (shown fragmentarily in Fig. 5) which is connected to the "No Sale" key 33 by a means of a link 90. From this, it will be readily understood that when the "No Sale" key is operated the shaft 81 will be rocked and by means of the arm 88 and its connection to the bail 86 of the "No Sale" counter the actuating pawl will be operated thereby adding a unit to the special counter.

The counter to the left of the "Customer" counter (Figs. 2 and 3) is known as the "Reset" counter and is provided for the purpose of registering the number of times that the resetting operation has been performed. As is best shown in Figs. 2, 3, and 4, the bail 91 which is associated with the "Reset" counted wheels 92 is provided with a laterally extending lug 93 which is in the path of the pin 79 attached to the bail 78 associated with the "Customer" counter. The bail 91 has attached thereto a laterally extending pin 94 which, as best shown in Figs. 5 and 7, is in the plane of a double arm 95 loose upon the shaft 81. The rearward portion of the arm 95 carries a pin 96 engaging a bifurcation 97 of a depressible key 98. The key 98 (as shown in Fig. 11) is designated as the "Total Reset" key and it must be depressed in order to unlock a resetting lever 99 (Figs. 5 and 7) before the latter can be operated to perform a resetting operation as will be subsequently explained in detail. The key 98 is shown in its normal position at Fig. 5 and depressed in Fig. 7 and from the first mentioned figure it will be clear that when the key 98 is depressed the pin 96 will be rocked downwardly thereby raising the forward end of the arm 95. As will be observed from Fig. 2 the actuating pawl 91 associated with the "Reset" counter is normally rearward of the bails 78 and 86 associated with the "Customer" and "No Sale" counters, respectively. When the forward end of the arm 95 is raised it will co-operate with the pin 94 and by means of the upper edge of the arm 95 it will cam the pin 94 upwardly and forwardly bringing it to the position shown in Fig. 7. During this operation the bail 91 was, of course, also forced upwardly and forwardly, but during this movement of the bail and actuating pawl, the pawl was merely slipping idly over the ratchet wheel.

However, when the machine is subsequently conditioned for an item entering operation and a key is depressed, the "Customer" counter will be operated in the usual manner. Since the bail 91 associated with the "Reset" counter has been moved to bring it in line with the bails associated with the two remaining counters (as shown in Figs. 3 and 4) the pin 79 of the customer counter operating bail will contact with the lug 93 and force the bail 91 downwardly and rearwardly to its normal position and thereby add a unit to the "Reset" counter. It will be clear, therefore, that the "Total Reset" key merely cocks the operating means and that the unit is only entered whenever the machine is subsequently operated.

As will be explained hereinafter an interlocking mechanism requires alternation of the operations of the key 98 and the resetting lever 99, but it will be obvious, of course, that the key 98 may be operated as many times as desired without disturbing the bail 91 after it has once been adjusted to the position shown in Figs. 3 and 7, in which position it is held by a detent 1292 (Fig. 12) as will be more fully explained hereinafter.

*Printing mechanism*

In cash registers of the class shown and described the total of the sales registered and other information is frequently obtainable only by reading the amount standing upon the totalizer elements and other registering devices. It is preferable, however, to have this information printed upon the record bearing material as it then forms a permanent and unchangeable record which may be referred to at any desired time. For this reason the illustrative machine is provided with a simple and effective printing mechanism for printing the desired information on a strip of paper.

In general, the printing mechanism comprises a printing frame which is pivotally mounted and adapted to be manually swung about its pivot by the use of a knob or key to carry a pair of impression elements against the two lines of printing type already described. The frame is normally spring held in its outward position and is provided with suitable inking devices and means for carrying and guiding a record strip. As has already been explained the locked cover 32 normally conceals and prevents access to the printing mechanism. The construction of the various elements of the printer will now be described generally, but not in detail, since it forms no part of the present invention. However, for details of construction and further explanation reference may be had to the application of Charles W. Green, Ser. No. 13,470, filed Mar. 6, 1925, now Patent No. 1,873,760, issued August 23, 1932.

Referring to Figs. 1, 5 and 7, it will be noted that the printing frame comprises a plate 100 integral with which are two side plates 101 and 102, the lower ends of which are apertured to receive the shaft 28. All of the associated printing elements are carried by the frame just referred to. Journalled in the side plates 101 and 102 at their upper portions is a shaft 103 forming the pivotal point of a platen 104 provided with two parallel rubber impression blocks 105.

The ribbon supporting frame comprises two parallel plates 106 and 107 which are attached to each other by any suitable means. Attached to the plate 107 is a pair of lateral plates 108 (one of which is shown in Figs. 5 and 6) substantially at right angles to the plate 107 and formed with elongated slots 109 to receive the platen supporting shaft 103.

It will be noted from an inspection of Fig. 5 that the supporting plates 106 and 107 are suitably bent so as to form channels 110 located just in line with the impression blocks 105 for the reception of ribbon carrying frames or plates 111 in which are held or fixed across apertures in the frames, strips of inking ribbon 112. A ribbon frame is provided for each printing line so that each can be removed or replaced independently of the other.

Referring to Fig. 1, it will be noted that the ribbon supporting plate 107 extends downwardly and is curved. Also extending between the side plates 101 and 102 and curved similarly to the lower portion of the plate 107 to form a narrow passage therewith is a curved plate 113 (Fig. 2) which serves as a support for the roll of paper. As best shown in Fig. 5 the paper strip is drawn from a roll 114 and one end is inserted between the plates 107 and 113 and guided over the rear faces of the platen 104, after which it will be guided by the upper curved portion 115 of the plate 107 so that it passes forwardly under a plate 116, which is riveted or otherwise secured to the side plates 101 and 102 and is formed at its upper forward edge with serrations 117 adapted to facilitate the tearing of a section of the record strip from the rest of the roll. As shown in Fig. 5, it will be noted that the plate 100 is cut away at 118 so as to permit the insertion of a finger to draw the upper portion of the record strip outwardly before detaching a section of it from the rest of the roll.

The relation of the printing devices to the cabinet is best shown in Figs. 1 and 6, and from Fig. 1, it will be noted that the cover 31' is apertured at its lower end at 119 to permit insertion of the roll of paper 114 and is also apertured at 120 in line with the opening 118 of the plate 100 to permit the insertion of a finger to draw out the printed record strip. The side portions of the cover 31' are each provided with a pair of elongated apertures 121, such as shown in Fig. 6. These are provided for the purpose of permitting the insertion of a new ribbon frame in the printer while the printer is in its normal position. When the printing mechanism is so positioned and it is desired to insert a new ribbon frame the latter is merely inserted in the aperture 121 and by forcing it laterally the old frame will be ejected from the opposite end sufficiently to permit its withdrawal by the fingers so that the printer may then accommodate the new ribbon frame.

In order to retain the printer in its forward or normal position, the side plate 101 has attached thereto by means of a lug 122 (Fig. 6) a bell-crank 123 loosely pivoted upon the pivotal shaft 28 of the printer. The tension of a spring 124 attached to the horizontal arm of the bell-crank 123 normally retains the printing devices in the position shown in the drawings.

In order to permit the printing mechanism to be forced rearwardly so as to take a printing impression from the adjusted type carriers there is provided a button 125 (Figs. 1 and 5) which is slidably mounted in the cover 31' and has its rearward portion contacting with the plate 100.

The "Customer" and "No sale" counters have adjacently mounted special printing members 126 (Fig. 3) which are loosely mounted upon the shaft 72 and carry indicia to identify these counters. It will also be noted that the totalizer 55 carries a similar special type block 127 bearing the word "Total" which is in correspondence with the printing line of the totalizer elements.

Let it be assumed that the hinged cover 32 has been raised so as to permit access to the printing devices and that the record strip has been properly inserted and that the ribbon frames are also in their proper places. The printing button 125, if now depressed, will force the entire printing frame rearwardly tensioning the spring 124 (Fig. 6). As the printing frame is forced rearwardly towards the type the rear ribbon supporting plate 106 will contact with a forward projection 128 (Fig. 5) of the intermediate frames 25 and 26, thereby holding the ribbons in their supporting plates against further movement. As the printing button is depressed still further the side plates 101 and 102, will, through the shaft 103 continue to force the platen rearwardly. At substantially this point of operation the lower impression block 105 will contact with the totalizer elements thereby holding the lower portion of the platen rigid and forcing the platen to rock slightly counter-clockwise as viewed in Fig. 5 so as to permit the upper impression block to strike the special counter printing elements with the result that the elements of the two printing lines are struck with substantially equal force. It will be understood that the rubber platen blocks will force the paper against the inking ribbons and adjusted type so that the impression will be made upon the strip of paper. For the best results the button 126 should be depressed sharply and quickly with the thumb so as to insure a clear and legible print on the record strip.

After the impression has been made the index finger may be inserted in the aperture provided for that purpose and the portion of the printed record strip may be withdrawn and detached from the rest of the roll.

Referring now particularly to Fig. 13 there will be seen an example of printing adapted to be performed by the illustrative machine. The word "Total" is printed adjacent the figures representing the total of cash sales for some particular period and parallel to this printing line is printed the information which is contained upon the special counter and date printing wheels. It will be noted from Fig. 3 that the abbreviation "NS" identifies the amount printed by the "No sale" counter while the abbreviation "Cust" identifies the amount printed by the "Customer" counter. Located adjacent to the three numerals printed by the "Reset" counter wheels 92 is the character "S" which is printed by a special type block 129I (Figs. 3 and 12) which comprises a portion of the present invention and as will be explained in detail hereinafter has a particular significance.

Control lock

During the description which has previously been given, reference has been made to a hinged cover 32 which conceals and covers the various manipulative devices. It is, of course, desirable to have this cover locked and to this end the illustrative embodiment of the invention herein disclosed is provided with a lock which releases the cover to obtain access to the different manipulative devices. This lock is shown in Figs. 2 and 6 identified by reference character 130 and is attached to a plate 131 which, in turn, is carried by the rear frame 23. The upper portion of the lock as shown in Fig. 6 projects through the cabinet 30 so as to permit the rotation of the barrel of the lock by the insertion of a suitable key. The barrel of the lock has attached thereto a cam 132 co-operating with pins 133 and 134 carried by a shiftable shaft 135 passing through holes formed in the intermediate frames 25 and 26. It will be clear that when the key is inserted in the lock and the barrel is turned the cam co-operating with the pin 133 will shift the shaft 135 to the left as viewed in Fig. 2. In order to guide the shaft 135 in its reciprocating movements and prevent it from rotating in the frames 25 and 26 there is attached to the shaft an arm 136 carrying a pin 137 working in an aperture in the side frame 26.

Co-operating with a notch in the shiftable shaft 135 is a bell-crank 138 (Figs. 2 and 6) which is pivoted at 139 to a stub shaft 140 attached to the frame 25. One end of the bell-crank 138 projects through an aperture formed in the frame 26 and projects into a hole formed in the sliding plate 141 (Fig. 6) guided by studs 142 carried by the side frame 26. The sliding plate 141 is provided with an extension 143 which passes through a slot in the cabinet 30 and rests quite closely against the right side of the printer cover 31'. In order to hold the cover 32 latched there is provided a spring operated catch 144 (Fig. 6) which is pivoted at 145 to the cover 32. The catch 144 is urged by a spring so as to normally engage a stud 146 carried by the printer cover 31'. Integral with the catch 144 is a projection 147 adapted to co-operate with the extension 143 of the slide 141.

To summarize the operation of the above it will be evident that when the key is inserted in the lock and the bolt is turned in a clockwise direction (as viewed in Fig. 2) the action of the cam 132 upon the pin 133 will be such as to shift the shaft 135 to the left as viewed in Fig. 2. This will rock the bell-crank 138 clockwise so as to draw the plate 141 rearwardly from the position shown in Fig. 6 and through the extension 143 operate the catch 144 to disengage the hooked portion from the stud 146. The cover 32 is now unlocked and may be raised to permit access to the various manipulative devices which it normally conceals.

Interlocking mechanism between printer and operating keys

The mechanism as thus far described is substantially complete and practically operative, but some devices which may be called precautionary devices are desired to prevent any possible misoperations of the machine.

Owing to the prejudice on the part of persons operating cash registers they are subjected to the severest strains in an effort to make them break down or print incorrect amounts. While the present machine has locking devices, such as described in the preceding section which when released merely unlock the various manipulative devices for operation, it includes also co-ordinated interlocking devices which prevent the simultaneous operation of two or more of the manipulative devices. It is desirable while printing is being performed that the operating keys be locked as long as the printer is in the printing position, and it is furthermore necessary in order to prevent fraudulent printing operation to prevent printing during the registering operation by the operating keys.

To this end the arm 60 which has been mentioned hereinbefore extends rearwardly and is connected by means of a pin 148 (Figs. 5 and 7) to a shiftable member 149 provided with an inclined slot 150 engaging a shaft 151 journalled in the side frames 25 and 26 (Fig. 2). The member 149 is provided with a forward projection 152 and somewhat in rear of said projection with a rounded cam edge 153 co-operating at times with a stud 154 carried by a locking member 155 rigidly attached to the shaft 151. The locking member 155 is provided with a stud 156 and a notch 157 adapted at times to co-operate with a locking stud 158 secured to the printer side frame 101. The shaft 151 at its other end (Fig. 6) is provided with another locking member 159 provided with a notch 160 similar to the notch 157 and adapted at times to co-operate with the locking stud 122 carried by the left printer side plate 102.

It will be evident from an inspection of Figs. 5 and 7 that when the printing mechanism is in its normal position and one of the keys is operated the shaft 43 will be rotated clockwise as viewed in Figs. 5 and 7, thereby rocking the arm 60 to draw the totalizer into engagement with the actuating racks. At the same time the member 149 will be drawn rearwardly and due to the inclination of the slot 150 the forward end of the member 149 will be forced upwardly as well as rearwardly so that by means of the camming edge 153 co-operating with the stud 154 the shaft 151 will be rocked counter-clockwise. Rocking of the shaft 151 in this direction will move the locking elements 155 and 159 so as to bring their respective locking edges 161 and 162 into the path of the associated locking studs

158 and 122, respectively. This will lock the printer against operation substantially throughout the down stroke of any of the operating keys, and since the operation of the totalizer takes place at this time it will be clear that it is impossible to simultaneously add an amount to the totalizer and print the amount standing on it.

It will be obvious on the other hand that when the printer is moved to effect printing, the locking studs 158 and 122 will move into their associated notches 157 and 160 formed in the locking elements 155 and 159, respectively. This will hold the shaft 151 rigidly together with the locking elements 155 and 159 so that if an attempt is made to depress one of the operating keys it will be prevented after a slight movement by the abutment of the camming edge 153 against the stud 154 carried by the rigidly held member 155. This is due to the fact that depression of a key will serve to lift the coupler and turn the shaft 43 which through the cam 61 would attempt to draw the link 149 rearwardly.

The means just referred to will, therefore, serve to prevent the operation of the operating keys while the printing mechanism is partially or fully operated. It will be noted, however, from Figs. 5 and 7 that if the printer is moved from normal position so that the locking studs engage their associated notches one of the operating keys may be slightly depressed, its extent of depression being controlled by the separation existing between the stud 154 and the locking edge 153. Due to the separation of the last mentioned elements it is possible that a key might be depressed sufficiently to insert a unit in the totalizer and then if the printer were operated a false record might be produced. Thus a dishonest employee might be given an opportunity to mis-operate the machine with resultant damage to the parts and an incorrect printing operation. In order to prevent such an occurrence a second interlock has been added as a precautionary measure.

For this purpose the bell-crank 123 (Fig. 6) previously mentioned, extends rearwardly and is connected by means of a pin 163 to a member 164 which is bifurcated at its rearward end to engage the shaft 43. The member 164 is equipped with a lug 165 adapted at times to be received in a square notch 166 formed in a disk 167 attached to the shaft 43. It will be clearly seen from Figure 6 that when the printer is rocked rearwardly, the member 164 will be forced in the same direction and through the co-operation of the lug 165 with the notch 166, the shaft 43 will be locked thus preventing any depression of the operating keys. Likewise when the shaft 43 has been displaced from its normal position by the depression of one of the operating keys the periphery of the disk 167 co-operating with the lug 165 will hold the member 164 rigid and will prevent any displacement of the printing mechanism from its normal position.

*Resetting devices*

At the termination of a day's business or any arbitrary period it is usually desirable that the various registering elements be returned to zero to prepare for the separate registration of the sales to be accumulated during a subsequent period. To this end the illustrative machine is provided with a single lever 99 which, when given a complete reciprocation, will reset the various elements to their zero positions.

As best shown in Fig. 11 the resetting lever projects through and works in a slot 168 formed in a portion of the cabinet 30 which is under the cover 32. The resetting segment 99, as shown in Figs. 7 and 8, is loosely mounted upon the shaft 49 and is provided with a forward extension 169 formed with rack teeth meshing with the teeth of a gear 170 (Fig. 3) loose upon a stub shaft 171 rigidly secured to the side frame 25. The pinion 170 has attached thereto at one side a mutilated pinion 172 meshing with a pinion 173 loosely mounted upon the shaft 72 which, it will be recalled, supports the consecutive numbering counter wheels. Also connected to the pinion 170 at its other side is a bent disk 174 which co-operates with a spool 175 pinned to the shaft 58, which it will be remembered, supports the totalizer elements. Attached to the spool 175 is a gear 176 which is normally out of the plane of the pinion 172 with which it is adapted to mesh at certain times. From the above, it will be evident that when the resetting segment rotates the gear 170, the pinion 172 and bent disk 174 will rotate as a unit. It will, furthermore, be noted from an inspection of Figs. 3 and 9 that the pinion 173 has integral therewith a semi-annular ring 177 which co-operates with a lateral projection 178 integral with a collar 179 pinned to the shaft 72. Due to the normal relationship between the semi-annular ring 177 and the lug 178 the pinion 173 can be given an idle movement before the semi-annular ring 177 contacts with the lug 178 to rotate the collar 179 and the shaft 72.

In order to reset the totalizer elements to zero each is provided with a pivoted pawl 51a which is spring-pressed against the shaft 58 which is provided with a series of notches 58a, one for each wheel of the totalizer. The resetting pawls are normally out of the path of the associated notches, but when the shaft 58 is shifted, as will be explained, the notches and pawls are brought into co-operative relationship and when the shaft 58 is turned the notches will contact with the ends of the pawls and pick up the totalizer elements in whatever position they may be standing at the beginning of the movement of the shaft and carry them around with it so that a complete rotation of the shaft in such direction will serve to reset the totalizer elements to zero or initial position. This method of resetting is well known in the art and is described in detail in the British Patent #135,465 of July 11, 1921 while the same principle of operation is disclosed in a patent to Thomas Carney #876,295, dated January 7, 1908.

The shaft 72 which carries the special counters is provided with a series of notches as 72a, similar to those in the totalizer shaft. These notches, however, are normally in the plane of the resetting pawls, as 74a, carried by the registering elements associated with the "Customer" and "No sale" counters so that this shaft need not be shifted laterally to reset these counters. The "Reset" counter wheels 92 (Fig. 3) are not provided with any resetting pawls or associated notches in the supporting shaft 72 so that when the shaft 72 is rotated, as will hereinafter be described in detail, the "Reset" counter elements will not be restored to their zero position but will continue to accumulate units whenever the resetting lever and the operating keys are operated alternately.

Assuming that the resetting lever 99 is unlocked for operation, it will be obvious that when it is moved from the position shown in Fig. 7 to the position shown in Fig. 8 the teeth of the segmental rack 169 carried by the lever will rotate the pinion 170 and the bent disk 174 and due to the co-operation of the said disk and the collar 175 the shaft 58 will be shifted to bring the pinion 176 into mesh with the teeth of the mutilated pinion 172 and furthermore to bring the resetting pawls and notches into co-acting relationship.

During this time the gear 173 will have been moved counter-clockwise as viewed in Fig. 9 until one end of the semi-annular ring 177 contacts with the lug 178 carried by the collar 179 (Fig. 3). At substantially the time that the pinions 176 and 172 are in engagement the annular ring 177 has been rocked sufficiently to contact with the lug 178 so that a further rearward movement of the resetting lever will, through the train of mechanism rotate the shafts 58 and 72, so that the notches in these shafts will co-operate with the pick-up pawls carried by the totalizer and the elements of the two special counters to restore them to their zero positions.

After the resetting lever has been forced rearward fully it is again returned to its normal position which will return the resetting shafts 58 and 72 backwardly without affecting the position of the registering elements. It will be understood that at the beginning of the return movement of the resetting lever there will be a lost motion between pinion 173 and the shaft 72 until the semi-annular ring 177 engages the opposite face of the lug 178, and that towards the end of the return stroke of the lever 99 the shaft 58 will be laterally restored to normal. When the resetting lever is at its home position the parts will again stand in the positions shown in Fig. 7.

It is essential that once the resetting operation has been started some means be provided to insure that a complete resetting operation will be effected. To this end there is attached to the mutilated pinion 172 a segment 180 (Fig. 4) provided with ratchet teeth meshing with a spring-urged pawl 181. From the above it will be obvious that once the resetting lever has been forced even partially rearwardly to reset the various elements, it will be necessary to give the lever a full stroke rearwardly and forwardly in order to bring the parts to normal position.

*Drawer release by an operation of the machine*

In a machine of the type herein disclosed it is customary to provide a cash drawer which is released upon each operation of the machine and ejected outwardly under the action of a spring to open the drawer for the purpose of permitting the making of change or depositing the money tendered. To this end the machine is provided with a cash drawer 182 (Fig. 1) suitably guided in a drawer base and normally urged outwardly by the usual drawer spring 183. The drawer, however, is retained in its innermost position by a drawer catch 184 which engages a portion of the cash drawer and which is pivoted to a short shaft 185 journalled in a yoke-shaped frame 186 attached to the drawer base. At the other end of the shaft there is attached an arm 187 (Fig. 7) connected to a link 188 which carries a roller 189 co-operating with a cam 190 fast to the rotation shaft. The roller 189 is urged against the cam 190 by means of a spring 191.

When the shaft 43 is rotated by an operation of the keys, the cam 190 will elevate the link 188 and through the train of mechanism just described will disengage the drawer catch from the cash drawer thus permitting the drawer spring to eject the cash drawer. The form of the cam 190 is such that the cash drawer will be ejected during the return stroke of the keys which is after the completion of the registering operation.

*Special character printing*

As has been stated hereinbefore the printing mechanism is normally operative and when the hinged cover is raised may be operated at any time to take an imprint from the characters presented at the printing lines by the various printing elements. This permits the operator of the machine to obtain the information regarding the amount of the sales for a certain period as well as the other data of which a record is made. The totals which are obtained without a subsequent clearing operation are designated as "subtotals" differentiating them from the total which is obtained prior to a clearing operation, which is usually designated a "'grand total". In order to indicate the different kinds of totals upon the record material the special character printing element 1291 previously referred to is provided. In its normal position (Fig. 12) it is adapted to print a character "S" (Fig. 13) thereby indicating that the printed total is merely a running or "subtotal."

Referring to Fig. 13 there will be seen a sample of an imprint made by the illustrative machine. The printed amount followed by "Total" in this figure represents the amount of the sales transacted since the last resetting operation and up to the time the impression was taken. Adjacent to the "Reset" number 002 is the letter "S" indicating that the total is merely a subtotal. The "Reset" number designates that two clearing operations were previously performed. The numerals 050, adjacent the abbrevation "Cust" indicates the number of times the machine has been operated since the last resetting operation, three of the fifty operations of the machine having been "No sale" operations as shown by the printed numbers 003 to the right of the abbreviation "NS". The date appears to the extreme right of the lower printing line.

Of course if the person in possession of the key of the lock 130 desires to obtain the printed information later he is free to do so, but each printed record will continue to bear the character "S" as well as the same "Reset" number indicating that a clearing operation has not been performed.

When a grand total is wanted it is desirable to indicate the fact that one is to be taken upon the record material so that the printed amounts will represent those which were taken just prior to a resetting operation. The resetting lever in the present instance is normally locked, but it is unlocked for operation whenever the "Total reset" key 98 is operated. Operation of the key 98 will bring into the range of the upper platen 105 the special character "G" carried by the member 1291 (shown in Fig. 12) so that when the printing mechanism is operated the character "G" will be printed upon the record strip in juxtaposition to the "Reset" number. Operation of the key 98 not only unlocks the resetting lever for operation, but performs a number of other functions which will be described as the specification progresses.

While depression of the special key unlocks the resetting lever, the resetting operation should not be performed until the printed information is first obtained. In practical operation the operator will rock the printing mechanism to print upon the record material the data shown in Fig. 14. The printed amount followed by the word "Total" in this case represents the sales for a period longer than that represented by the record in Fig. 13 and for this reason the printed record shown in Fig. 14 shows a greater number of operations of the machine and "No sale" operations. The reset number "002" has not been changed since no clearing operations were performed in the meantime, but adjacent this number is the letter "G"—indicating that the "Total reset" key has been depressed so as to prepare the mechanism for a resetting operation. The manner in which the key 98 sets the special character printing element will now be explained in detail.

The key 98 (Figs. 2, 5 and 7) is provided with a slot 192 engaging the shaft 81 and is connected to a lever 193 by a pin 194. Connected to the lever 193 by means of a pin and slot connection 195 is a rearwardly extending plate 196 loosely mounted upon the shaft 81 and situated between the lever 193 and the stem of the key 98. In order to hold the key in its depressed position there is provided a latching member 197 loosely mounted upon the shaft 81 and provided with a shoulder 198 adapted to co-operate with a lug 199 carried by the stem of the key 98. The latching member 197 is normally urged forward by means of a spring 197' (see Fig. 8).

The resetting lever 99 as previously explained, performs a resetting operation by movement rearwardly, but it is normally (Fig. 5) locked by means of a stud 200 contacting with the extreme forward edge of a gravity operated pawl 201 pivoted at 202 to the plate 196. The weight of the pawl 201 urges it to rock clockwise as shown in Figs. 5, 7, and 8, but it is limited in this movement by the co-operation of a stud 203 carried by the pawl co-operating with the upper edge of the plate 196.

When the operator desires to print a grand total, the key 98 is depressed and as stated hereinbefore this serves to operate arm 95 to elevate the pin 94 to cock the operating means associated with the "Reset" counter so that when the machine is subsequently operated it will add a unit to the counter indicating the "Reset" number pertaining to the next series of sales to be registered. This operation of arm 95 by the key 98 will, by means of a reduced portion of the pin 94, engaging a slot in the pivoted member 1291 rock the latter clockwise (as viewed in Fig. 12) thereby bringing the lower character "S" carried by the plate out of the range of the printing platen 105 and bringing the upper character "G" to such a position so that when the printing mechanism is subsequently operated the character "G" will be printed adjacent the reset number (see Fig. 14). The special type carrier is aligned in either position by means of the spring pressed aligning pawl 1292 (see Fig. 12).

When the key 98 was depressed the lug 199 carried thereby rocked the latching member 197 rearwardly until the shoulder 198 of the latter could snap over the lug 199 under the action of spring 197' the latching member 197 thereby retaining the key in its depressed position. Furthermore, as the key 98 was depressed the lever 193 was rocked downwardly and through the pin and slot connection 195 to the plate 196 the latter was also rocked downwardly about its pivotal point 81 carrying the pawl 201 downwardly and bringing its forward end out of co-operation with the stud 200 carried by the resetting lever 99. Since the resetting lever is now unlocked for operation it may be forced rearwardly to perform a resetting operation as has been explained in detail hereinbefore.

As the resetting lever is forced rearwardly from the position shown in Fig. 7 to the position shown in Fig. 8, the stud 200 carried by the resetting lever will pass over the upper edge of the pawl 201 and as the lever approaches the end of its rearward movement the stud will co-operate with the rearward extension of the pawl 201 rocking it counter-clockwise (as viewed in Fig. 7) until the stud 200 clears the end of the pawl 201. This will permit the pawl to occupy the position shown in Fig. 8 from which it will be clear that as the resetting lever 99 is drawn forwardly to its initial position the stud will co-operate with the underside of the pawl 201 and raise the plate 196 as well as lever 193 and through the latter will positively force the key 98 to its upper or normal position. As is best shown in Fig. 8, the latching member 197 is provided with a downward extension 204 adapted to co-operate with a stud 205 carried by the resetting lever 99. The stud 205 co-operating with the extension 204 will disengage the shoulder 198 from the lug 199 carried by the stem of the key and will hold them disengaged during the time that the pin 200 is raising the plate 196 to return the key to its normal position. When the key 98 is brought to its normal position the stud 200 will again occupy a position in front of the pawl 201 to prevent a second stroke of the lever 99 until the key 98 is again depressed.

Since it is usually desirable when resetting the various totalizer elements to zero to balance the cash register and remove the money from the cash drawer suitable means have been provided to release the cash drawer by the depression of the key 98. To this end the pin 194 co-operates with a slot 206 formed in a bell-crank 207 loosely pivoted upon the shaft 49, the rearward arm of the bell-crank co-operating with the stud 208 carried by the drawer release link 188. It will be obvious that when the key 98 is depressed, it will rock the bell-crank 207 clockwise (as viewed in Fig. 5) and by means of the stud 208 it will elevate the drawer release link 188 and through the connections previously described release the cash drawer.

In order to prevent a number of mis-operations which might be possible, certain additional precautionary devices are included so as to insure as nearly as possible the correct operation of the machine.

To this end the present invention includes means whereby, when the key 98 is depressed to unlock the resetting lever for operation, the operating keys will be locked until the lever 99 has been operated. For this purpose the plate 196 is provided with a downwardly extending curved portion 209 which normally (Fig. 5) is out of the path of a stud 210 carried by the box cam 61. However, when the key 98 is depressed (as shown in Fig. 7) the rearward edge of the curved portion 209 of the plate 196 will pass in front of the stud 210 thereby locking the rotation shaft and the keys against operation as long as the "Total reset" key is in its depressed position.

It will be noted from Fig. 5 that so far as this interlock is concerned it is possible to operate the keys a partial amount, before the "Total reset" key 98 is depressed thereby rocking the shaft 43 to bring the stud 210 away from the curved extension 209 and then to depress the said "Total reset" key 98 to unlock the resetting lever. This, of course, would permit an operation of the resetting lever after a key has been partially depressed with possibly a resulting interference between different parts of the mechanism. To preclude such a possibility the resetting lever 99 is provided with a rearward projection 211 which has an edge 212 concentric with respect to the shaft 49 and another edge 213 which is concentric with respect to the rotation shaft 43 whenever the lever is in normal position. The projection 211 is in the plane of the box cam 61, previously referred to, the box cam being provided with a milled slot 214 normally concentric with shaft 49 and adapted to receive the projection 211 at certain times. If the keys are partially operated so as to bring the stud 210 away from the curved extension 209 to permit the depression of the "Total reset" key, it will be clear that movement of the unlocked resetting lever 99 will be prevented by projection 211 contacting with the periphery of the partially rotated cam 61.

As will be clear from Fig. 8 the co-operation of the stud 200 with the underside of the pawl 201 will raise the plate 196 to return the key 98 to its normal position before the lever 99 is fully returned to its normal position. Since this permits the curved extension 209 to be brought out of co-operation with the stud 210 carried by the disk 61 it would normally unlock the shaft 43 and permit the operation of one of the keys before the resetting lever has been restored to its normal position. However in view of the second interlock just described, it will be noted that whenever the resetting lever is shifted out of its normal position the projection 211 will pass into the milled slot 214 thus positively locking the keys against operation until the resetting lever is brought back fully to its normal position. While this mechanism is very simple it provides an adequate preventive for any attempted mis-operations of this nature.

While the resetting operation is being performed it is desirable to lock the printing mechanism against movement. For this purpose as the resetting lever is moved from the position shown in Figs. 5 and 7 to the position shown in Fig. 8 a bevelled edge 215 formed on a member 216, which is connected to the resetting lever 99 by the pin 205 previously referred to, and which is bifurcated at 217 to engage the transverse shaft 151, co-operates with the pin 154 of the locking element 155. As the resetting lever 99 and link 216 are drawn rearwardly the edge 215 will cam the pin 154 upwardly rocking the locking member 155 clockwise to bring a locking edge 1611 formed just above the slot 157 in the member in front of the locking stud 158. In a similar manner (referring to Fig. 6) the locking arm 159 will be rocked counter-clockwise to bring a locking edge 1621 in front of the locking stud 122. This will positively lock the printer against operation as long as the resetting lever is displaced from its normal position.

When the resetting lever is returned to its normal position from the position shown in Fig. 8 a bevelled edge 218 will contact with the stud 156 and rock the shaft 151 counter-clockwise bringing the parts to the position shown in Fig. 7 wherein the printing mechanism is again unlocked for operation.

The illustrative machine is also provided with means under the control of the single lock whereby the special key 98 and resetting lever 99 will be locked against operation until a detachable key has been inserted in the lock and the barrel of the latter has been rotated to its unlocking position. This effectively prevents any operation of the special key or resetting lever in the event that the cover 32 was not securely latched, or if by a fraudulent operation, the cover had been released to obtain access to these manipulative devices. As is best shown in Fig. 7 the plate 196 is provided with a semi-circular notch 219 which normally (Fig. 5) engages the periphery of the shaft 135. It will be clear from Fig. 2 that when the shaft 135 is shifted to the left, by the rotation of the barrel of the lock 130 it will bring a milled slot 220 into the plane of the plate 196 allowing the special key to be depressed. In a similar manner the resetting lever is provided with a semi-circular notch 221 (Fig. 5) which normally co-operates with the periphery of the shaft 135, but when the shaft 135 is shifted it will bring another slot 222 (Fig. 8) into the plane of the rearward extension of the resetting lever 99. The means just described also operates in a converse manner, that is, it prevents the reverse shifting of the shaft 135 by the rotation of the barrel of the lock when either the special key or resetting lever is displaced from its normal position. It will be obvious from Fig. 7, that when the special key 98 is depressed the extreme rearward portion 223 of the plate 196 will co-operate with the milled slot 220 to hold the shaft 135 rigid and prevent its reverse movement. In a similar manner when the resetting lever is displaced from its normal position the upper edge of its rearward extension co-operating with the notch 222 (Fig. 8) will hold the shaft 135 rigid and therefore, the lock cannot be turned back to normal so long as the resetting lever is moved from its normal position. This effectively prevents the latching of the cover 32 if either of the manipulative devices should be partially operated.

*General summary of operation*

The nature of the improved mechanism is such that in order to make the foregoing description as clear as possible it has been necessary to state the operation considerably in detail as an incident to explaining the various features of construction. A complete re-statement here of the operation is therefore believed to be unnecessary. However, a résumé of the general operation of the machine will now be given to co-ordinate the operation and functions of the various parts which have been described in detail.

To enter the first cash transaction which it will be assumed amounts to $1.65 the appropriate keys in the dollars, dimes and pennies banks are depressed so that the notches 38 (Fig. 1) in the rear ends of these keys engage the flange 37 of the key coupler 36 and through the rotation shaft 43 and the link 59 (Fig. 4) the totalizer elements 57 (Fig. 1) are drawn into engagement with the differentially operated racks 54. As the proper keys are depressed the associated rollers 47 will work in the associated cam slots 52 formed in the plates 48 of the differential frames related to the three banks. The frames 50 will each be differentially operated so as to move the racks 54 an amount commensurate with the depressed keys. Since the totalizer pinions 58' are drawn into mesh with the actuating racks 54 before the racks have moved, the operated racks will move the pinions 58' differentially so that the amount $1.65 will be added on the totalizer elements 57. On the return of the keys to normal position the totalizer pinions will be disengaged from the racks so that the return movement of the latter will not affect the amount registered.

During the rotation of the shaft 43 the eccentrically mounted disk 83 (Fig. 10) will operate the bell-cranks 82 and 80 so as to rock the bail 78 to add a unit in the units wheel 74 (Fig. 3) of the "Customer" counter. During the first transaction following a resetting operation the pin 79 associated with the "Customer" counter will co-operate with the extension 93 of the bail 91 associated with the "Reset" counter, which was cocked forward on the previous resetting operation, and will thus force the bail 91 rearwardly so as to add a unit in the "Reset" counter. The number now standing on the "Reset" counter is the special reset number for the sales to be accumulated during the period just begun.

As the shaft 43 rotates the cam 190 (Fig. 7) co-operating with the stud 189 raises the drawer release member 188, and through the arm 187 and the shaft 185 raises the drawer catch 184 upwardly disengaging it from the cash drawer and permitting the spring 183 to eject the latter outwardly.

Whenever it is necessary to release the cash drawer for the purpose of making change, etc. the "No sale" key 33 may be operated and during its depression the link 90 (Fig. 5) will be drawn downwardly and by means of the arm 89 attached to the shaft 81 will rock said shaft as well as the arm 88 (Fig. 2) and by means of the co-operation of the latter with the bail 86 will add a unit in the "No sale" counter wheels 84.

At the termination of a day's business it is desirable to obtain the available information in printed form and to this end the proprietor inserts his key in the lock 130 (Fig. 2) and rotates the cam 132 clockwise (Fig. 2) unlatching the cover 32 so that it may be elevated to render access to the printing button 125 (Fig. 5). If the printing impression which is to be obtained is not to be followed by a clearing operation the special key 98 will not be depressed, but the printer button 125 will be sharply depressed so as to force the rubber impression blocks 105 rearwardly thereby forcing the paper against the inking ribbon and adjusted type members. After the printing operation has been performed the printed portion of the strip (an example of which is shown in Fig. 13) is withdrawn and detached from the rest of the roll.

If a key should have been accidentally partly depressed prior to the operation of the printing mechanism the member 149 (Fig. 5) will have been shifted rearwardly and through the co-operation of the cam edge 153 with the pin 154 the shaft 151 will have been rocked counter-clockwise. This will have resulted in bringing the locking edge 161 (below the notch 157) into co-operation with the stud 158 carried by the printer frame. In a similar manner (referring to Fig. 6) the locking edge 162 (below the notch 160 of the member 159) will have been brought into locking co-operation with the stud 122 carried by the opposite side of the printer frame. It will be obvious, therefore, that it will be impossible to operate the printing mechanism whenever one of the keys is away from its normal position. It may be noted incidentally that this rocking of the pin 154 downwardly also serves to prevent the operation of the resetting lever by co-operation with the notch below the cam surface 215 of link 216.

The locking devices shown in Fig. 6 comprising the member 164 connected to the printer by the arm 160 and carrying the lug 165 co-operating with the periphery of the disk 167 will also prevent rearward movement of the printing frame to obtain an imprint, whenever the shaft 43 has been turned by the partial depression of an operating key.

Conversely when the printing mechanism is displaced, the locking studs 158 and 122 will co-operate with their respective notches 157 and 160, to hold the shaft 151 rigid and through the pin 154 to prevent the rearward shifting of the member 149 by the depression of one of the keys. During the rearward movement of the printing mechanism (referring to Fig. 6) the lug 165 entering the square notch 166 of the disc 167 will also prevent rotation of the shaft 43 by the depression of one of the operating keys.

Since the special type carrying member 1291 (shown in Fig. 12) has not been moved from its normal position, it will print the latter "S" adjacent the reset number thus indicating that the printing of the total has not been followed by a clearing operation.

When it is desired to print a total which is to indicate the grand total of all the items entered in the machine during a particular period after which the totalizer elements are to be brought to their normal positions in preparation for the accumulation of a series of items comprising a subsequent period of business, the special key 98 designated as "Total reset" is depressed and through the pin and slot connection 96 and 97 (Fig. 5) to the double arm 95 it will rock the pin 94 upwardly and forwardly so that the operating pawl associated with the "Reset" counter will slip over the ratchet wheels into its forward cocked position. This will have brought the lug 93 (Fig. 3) into contact with the pin 79 carried by the "Customer" counter operating bail 78 so that this bail, when subsequently operated, will operate the "Reset" operating bail 86 and accumulate a unit in the "Reset" counter during a subsequent operation of the machine.

While the pin 94 was forced upwardly and forwardly it also rotated the type carrying member 1291 (Fig. 12) thus bringing the character "G" into the range of the upper printing platen 105. Therefore, when the printing mechanism is subsequently operated the character "G" (as shown in Fig. 14) will be printed in juxtaposition to the "Reset" number in place of the letter "S".

It should be stated that when the shaft 135 was shifted to the left (as viewed in Fig. 2) to release the cover 32 it brought a notch 220 (Fig. 2) into the plane of the plate 196 thereby unlocking the key 98. At the same time the second notch 222 (Fig. 8) formed in the shaft 135 was brought into the plane of the resetting lever 99 thereby partially unlocking it for operation, but since the lever 99 is normally locked against movement by the pin 200 engaging the rearward end of the pawl 201 (Fig. 5) it required the depression of the key 98 to effect such disengagement and to fully unlock the lever.

Depression of the key 98, as mentioned caused the lug 199 carried thereby to engage the shoulder 198 formed on the latching lever 197 thereby locking the key in its depressed position.

When the key 98 was depressed, the pin 194 (Figs. 5 and 7) co-operating with a slot 206 formed in a bell-crank 207 and through the co-operation of the latter with the pin 208 elevated the link 188 which by means of the arm 187 and shaft 185 disengaged the catch 184 from the drawer 183 thus permitting the drawer spring to eject the cash drawer in the usual manner.

As a further result of the depression of the key 98 the lever 193 was rocked clockwise (as viewed in Fig. 5) so as to effect the unlocking of the resetting lever as before explained, by means of the pin and slot connection 195 rocking the plate 196 downwardly about its pivotal point 81 and carrying the pawl 201 downwardly to bring its rearward end out of co-operation with the stud 200 carried by the resetting lever 99. At the same time the extension 209 of the plate is brought in front of the stud 210 carried by the disc 61 whereby operation of the operating keys is prevented.

Since the resetting lever is now fully unlocked for operation it may be forced rearwardly to perform a resetting operation and as it is so moved the segment 169 (Fig. 7) carried by the lever will rotate the gear 170 (see Fig. 3 also) and the bent disk 174 to shift the shaft 58 laterally until the notches in the shaft co-operate with the resetting pawls carried by the totalizer elements 57. At the same time the gear 176 carried by the resetting shaft 58 will be meshed with the gear 172 which is rotated with the gear 170 and in turn is also rotating the gear 173 to take up the play normally existing between one end of the annular ring 177, carried by the gear 173, and the lug 178, integral with the collar 179 fast to the special counter resetting shaft 72. Further rearward movement of the resetting lever 99 will rotate both of the resetting shafts 58 and 72 so as to reset all the totalizer elements and all the special counter accumulating elements, with, of course, the exception of the reset counter wheels.

During the movement of the resetting lever from the position shown in Fig. 7 to the position shown in Fig. 8 to reset the totalizer elements to zero, the stud 200 carried by the resetting lever passed over the upper edge of the pawl 201 and as the lever approached the end of its rearward movement the pin 200 rocked the pawl 201 counter-clockwise (as viewed in Fig. 7) until the stud 200 cleared the end of the pawl. The relation between the pawl 201 and the pin 200 when the lever has reached its extreme rearward limit is best shown in Fig. 8 and it will be obvious from this figure that when the pin 200 is moved forwardly again it will co-operate with the underside of the pawl 201 and raise the plate 196 so that through the lever 193 it will positively force the key 98 to its normal position. In order to permit this return operation it is necessary that the lug 199 and shoulder 198 be disengaged and this disengagement is performed at the end of the rearward movement of the lever by the pin 205 co-operating with the downward projection 204 of the latching member 197.

Simultaneous operation of the keys and resetting lever is prevented by the engagement of the projection 211 (Fig. 8) of the resetting lever 99 with either the milled slot 214 formed in the disk 61 or the periphery of the same. As the resetting lever was moved from its normal position as before explained, the member 216 was drawn rearwardly and by means of the cam edge 215 it rocked the shaft 151 clockwise thereby bringing the locking edge 1611 (located above the notch 157 formed in the member 155) into locking relationship with the stud 158 carried by the printer frame. In a similar manner (referring to Fig. 6) the locking edge 1621 of the member 159 was brought into co-operation with the locking stud 122 thus positively locking the printer against operation as long as the resetting lever is displaced from its normal position.

While the reset lever is unlocked immediately upon the depression of the "Total reset" key 98, the proper operation of the machine requires a printing operation to be performed after the key 98 has been depressed and before the resetting operation takes place.

After the resetting operation has been performed, the printer button is usually again depressed in order to indicate on the record strip whether the resetting operation has been correctly performed. If this is the case the record strip will bear an imprint similar to that shown in Fig. 15.

While the form of embodiment of the invention herein shown and described is admirably adapted to fulfill the objects primarily stated it is to be understood that it is not intended to confine the invention to the one form herein shown, since it may be embodied in various forms all coming within the scope of the claims which follow:

What is claimed is:

1. In a cash register having an operating mechanism, a totalizer operated thereby, and a clearing device therefor, the combination of a manipulative device, means restricting operation of these two devices to alternate operations thereof, a special type carrier adjusted by said manipulative device, and means controlled by the operating mechanism for restoring the type carrier to its normal position.

2. In a cash register having a totalizer, an operating mechanism therefor, and a normally locked lever for resetting the same, the combination of a depressible key, means controlled by the key for unlocking the lever, means controlled by the key for locking the operating mechanism, a special type carrier adjusted by the depression of said key, means controlled by the lever for restoring the depressed key, thereby unlocking the operating mechanism, and means operated by the operating mechanism to restore the special type carrier.

3. In a cash register, the combination of a totalizer, registering keys therefor, resetting mechanism for said totalizer, adjustable means which when adjusted from a normal position compels an operation of the resetting mechanism before the registering keys can be operated, and connections for automatically restoring said adjustable means to normal upon operation of the resetting mechanism.

4. In a cash register, the combination of a key, a special counter, operating means therefor, means controlled by the key for adjusting said operating means, a main operating mechanism, means under control of the operating mechanism for operating the special counter operating means, after it has been adjusted by the key, and a special type carrier movable with said counter operating means.

5. In a cash register, the combination of a key, a lever normally locked, a special counter, operating means therefor, means controlled by the key for adjusting said operating means, a main operating mechanism having connections to operate the special counter operating means after it has been adjusted by the key, means controlled by the key for simultaneously unlocking the lever and locking said operating mechanism, and means under control of the lever for unlocking the operating mechanism, after it has been locked by the manipulation of said key, thereby permitting the operating mechanism to operate the special counter operating means.

6. In a machine of the class described, a totalizer comprising a series of printing elements, means for entering items into said totalizer, means for printing the totals standing on said totalizer, separate means for clearing the totalizer at the will of the operator, a special element bearing two characters for printing in connection with totals, said last mentioned element being adapted to print one designating character when no clearing operation is to follow and another designating character when clearing is to be performed after the printing of a total, and manipulative means for determining which character shall be printed, and automatically preventing an operation of the item entering means until after a clearing operation when the manipulative means has positioned the second mentioned character for printing.

7. In a machine of the class described, a totalizer, means for entering items therein by an operation of the machine, means for clearing said totalizer while said item entering means remains idle, means normally preventing the operation of said clearing means, settable devices for releasing said clearing means for operation, means for latching said devices in set position, and connections whereby an operation of said clearing means releases said settable devices and positively restores them to normal unset position.

8. In a machine of the class described, a totalizer, means for entering items therein, including actuators, means for rocking the totalizer into engagement with the actuators, means for printing the totals standing on said totalizer, and means including a link connected to said totalizer rocking means for preventing the simultaneous operation of said totalizer rocking means and said total printing means, whereby the printing of a total is prevented during the actuation of the totalizer.

9. In a machine of the class described, the combination of a consecutive number counter, a main operating mechanism, means for actuating said counter, a separate manipulative means for fully operating said actuating means in one direction, and means under control of said main operating mechanism for restoring said actuating means to normal position after it has been operated by said manipulative means.

10. In a machine of the class described, the combination of a consecutive-number counter, an actuating mechanism for the counter, means for fully operating the said actuating mechanism, main operating mechanism, devices preventing the simultaneous operation of the said means and the main operating mechanism, and means whereby operation of the main operating mechanism effects restoration of said actuating mechanism.

11. In a machine of the class described, the combination of a main operating mechanism, a consecutive number counter, means for actuating the said counter, means for setting the actuating means, means whereby the setting means may be moved to home position after an operation thereof, while the actuating means remains in actuated position, and devices operated by the main operating mechanism for returning home the actuating means to condition the counter for a new actuation.

12. In a machine of the class described, a totalizer for accumulating items, operating means to perform such accumulation, means for printing a record of the accumulated total while the operating means is at rest, clearing mechanism for the totalizer, an operable means adapted, when operated, to make necessary a clearing operation before a subsequent accumulating operation can be effected, and means, controlled by said operable means, for indicating on the printed record whether said operable means was operated prior to the printing operation.

13. In a cash register having a totalizer, means to enter items therein, means for printing the total of the items entered, and means for resetting the totalizer to zero, the combination of a type carrier bearing a distinguishing character, means for locking the item entering mechanism and for moving the character to printing position, and means for releasing the locking means only upon operation of the resetting mechanism, said printing means taking an impression from the distinguishing character when the total is printed, to thereby indicate that the item entering means is locked and that the resetting means must be operated before further item entering can be performed.

14. In a cash register having a totalizer, means to enter items therein, means for printing the total of the items entered, and means for resetting the totalizer to zero, the combination of means for locking the item entering mechanism against operation, means to set a distinguishing character for printing as the item entering mechanism is locked, means for releasing the locking means only upon operation of the resetting mechanism, and means for printing the distinguishing character at the time the total is printed to signify that a resetting operation must be performed before items can be entered.

15. In a cash register having a totalizer means to enter items therein, means for printing the total of the items entered, and means for resetting the totalizer to zero, the combination of means to condition the machine for resetting, means operated by the conditioning means for locking the item entering mechanisms, means for releasing the locking means only upon operation of the resetting mechanism, and a special printing character, set by the conditioning means, and effective, upon operation of the printing means, to indicate that the machine has been conditioned for resetting and that no subsequent item entering can be performed prior to a resetting operation.

16. In a cash register, the combination of a totalizer, amount keys for operating the same, clearing means for said totalizer, a printing mechanism adapted to produce a record from said totalizer, means for indicating the significance of the amount on the record, having one portion normally effective to indicate that the amount is a sub-total, said indicating means being adjustable prior to a clearing operation to render another portion thereof effective to indicate that the amount shown on the record is a grand total, and means operated by the amount keys subsequent to a clearing operation, for returning the indicating means to its normal position.

17. In a cash register, the combination of a totalizer, item entering mechanism, means manually operable to effect clearing of the totalizer, separate manual means for printing totals from the totalizer, a manipulative device operable preparatory to an operation of the clearing means, means, operated by the manipulative device to prevent operation of the item entering mechanism, means operable, upon operation of the clearing means, to render the preventing means ineffective, and means controlled by the manipulative device for setting a special printing character to print simultaneously with the total so as to indicate that the printing operation will be followed by a clearing operation before further item entering is effected.

18. In a cash register having an operating means, a totalizer, and normally locked resetting means for said totalizer, the combination of a special key, means whereby the depression of the key unlocks the resetting means for operation, a special type adjusted by the special key when it is depressed, said special type indicating that a clearing operation is to be performed, and means controlled by the operating means for restoring the special type carrier during the first item entering operation after a resetting operation.

19. In a cash register having an operating means, a totalizer, and normally locked resetting means for said totalizer, the combination of a special key, means whereby the depression of the key unlocks the resetting mechanism for operation, latching means for the special key, a type carrier settable by the special key to indicate that a resetting operation is to be performed, means under control of the resetting means for disabling the latching means and causing the return of the special key, and means controlled by the operating mechanism for restoring the special type carrier during an item entering operation subsequent to the resetting operation.

20. In a cash register having an operating mechanism, a totalizer, and normally locked resetting means therefor, the combination of a manipulative device, means whereby the operation of the device unlocks said resetting means for operation, means for latching the manipulative device in operated position, a type carrier adjustable under control of the manipulative device, means whereby the resetting means, when operated, disables said latch and restores the operated manipulative device, and means controlled by the operating mechanism for restoring the adjusted type carrier.

21. In a cash register having a totalizer, a normally locked resetting lever for said totalizer, and an operating mechanism, the combination of a key, means controlled by the key for simultaneously unlocking the lever and locking the operating mechanism, said resetting lever having means to unlock the operating mechanism when the lever is operated, and a special type carrier adjusted by the key and operable to indicate that the reset lever must be operated to unlock the machine for subsequent operation.

22. In a cash register, the combination of means to operate the machine to enter items, a totalizer for registering items during successive operations, means for printing totals from the totalizer, normally locked resetting mechanism for said totalizer, a manipulative device, means whereby operation of the manipulative device unlocks the resetting mechanism and means controlled by the depression of the manipulative device for preventing an operation of the item entering means prior to an operation of the resetting mechanism, and for setting a special printing character to print simultaneously with the total so as to indicate that the resetting mechanism has been unlocked for operation.

CHARLES W. GREEN.